United States Patent
Kitagawa (10) Patent No.: US 8,230,138 B2
(45) Date of Patent: Jul. 24, 2012

(54) MEMORY CONTROL DEVICE, DATA PROCESSOR, AND DATA READ METHOD

(75) Inventor: Daisaku Kitagawa, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/864,754

(22) PCT Filed: Nov. 25, 2009

(86) PCT No.: PCT/JP2009/006344
§ 371 (c)(1), (2), (4) Date: Jul. 27, 2010

(87) PCT Pub. No.: WO2010/061588
PCT Pub. Date: Jun. 3, 2010

(65) Prior Publication Data
US 2010/0318691 A1      Dec. 16, 2010

(30) Foreign Application Priority Data
Nov. 28, 2008   (JP) ................. 2008-303970

(51) Int. Cl.
*G06F 3/00*      (2006.01)
*G06F 13/00*     (2006.01)

(52) U.S. Cl. ......... 710/33; 710/2; 710/5; 710/8; 710/15; 710/36

(58) Field of Classification Search .................. None
See application file for complete search history.

(56) References Cited

U.S. PATENT DOCUMENTS

| 6,768,358 B2 | 7/2004 | Birk et al. |
| 6,889,331 B2 | 5/2005 | Soerensen et al. |
| 6,978,350 B2 | 12/2005 | Birk et al. |
| 7,007,132 B2 | 2/2006 | Soerensen et al. |

(Continued)

FOREIGN PATENT DOCUMENTS
JP       11-65920       3/1999

(Continued)

OTHER PUBLICATIONS

Understanding Burst Mode Flash Memory Devices, Jul. 2003, Spansion, [online, accessed on Aug. 26, 2011], URL: http://www.spansion.com/Support/AppNotes/23710.pdf.*

(Continued)

*Primary Examiner* — Scott Sun
(74) *Attorney, Agent, or Firm* — Wenderoth, Lind & Ponack, L.L.P.

(57) ABSTRACT

After reading data from a memory in response to a read request received from a bus master and burst transferring the read data, a memory interface 100 continues to read and store (i.e., continuously reads and stores) data starting from an address that follows all of addresses of the read data. Upon receiving a new read request from the bus master within a predetermined time, the memory interface 100 determines whether a difference between an address specified by a previous read request and an address specified by a new read request falls within a predetermined range. If it is determined positively, the memory interface 100 successively transfers the stored data in response to the new read request. If it is determined negatively, or if the reception of the new read request is not performed within the predetermined time, the memory interface 100 terminates the continuous data read.

7 Claims, 10 Drawing Sheets

U.S. PATENT DOCUMENTS

| | | |
|---|---|---|
| 7,114,093 B2 | 9/2006 | Tardieux et al. |
| 7,159,134 B2 | 1/2007 | Soerensen et al. |
| 7,174,543 B2 | 2/2007 | Schwemmlein et al. |
| 7,315,956 B2 | 1/2008 | Jensen et al. |
| 7,698,590 B2 | 4/2010 | Jensen et al. |
| 2003/0051231 A1 | 3/2003 | Schwemmlein et al. |
| 2003/0058052 A1 | 3/2003 | Birk et al. |
| 2003/0061445 A1 | 3/2003 | Birk et al. |
| 2003/0070051 A1 | 4/2003 | Soerensen et al. |
| 2003/0071657 A1 | 4/2003 | Soerensen et al. |
| 2003/0117176 A1 | 6/2003 | Tardieux et al. |
| 2003/0126487 A1 | 7/2003 | Soerensen et al. |
| 2003/0149809 A1 | 8/2003 | Jensen et al. |
| 2003/0174132 A1* | 9/2003 | Kunimatsu et al. ........... 345/419 |
| 2006/0095621 A1* | 5/2006 | Vinogradov et al. ......... 710/100 |
| 2008/0034132 A1 | 2/2008 | Nakatake |
| 2008/0077770 A1 | 3/2008 | Jensen et al. |
| 2008/0077820 A1 | 3/2008 | Jensen et al. |

FOREIGN PATENT DOCUMENTS

| | | |
|---|---|---|
| JP | 2001-229074 | 8/2001 |
| JP | 2005-502144 | 1/2005 |
| JP | 2008-59565 | 3/2008 |
| WO | 03/021600 | 3/2003 |

OTHER PUBLICATIONS

International Search Report issued Jan. 19, 2010 in International (PCT) Application No. PCT/JP2009/006344.

* cited by examiner

MEMORY CONTROL DEVICE, DATA PROCESSOR, AND DATA READ METHOD

TECHNICAL FIELD

The present invention relates to increasing data read speed from a memory.

BACKGROUND ART

It is of course better to read data from a memory faster in a shorter time. In particular when the memory stores a program, a quicker read leads to a quicker start of the program execution. The high-speed read from a memory is especially useful in a mobile phone, as a memory of the mobile phone stores executable format programs and commands that can be read and executed directly. Meanwhile, a method for reading and executing an executable format program directly from a memory without copying it into a RAM or the like is called XIP (eXecute In Place).

For a faster data read from a memory, burst transfer is generally performed to enhance data transfer efficiency. For example, in burst transfer, a memory interface circuit accesses the memory to acquire a predetermined amount of data collectively in response to a read request from a CPU. The acquired data spans a plurality of addresses starting from an address specified by the read request. The acquired data is transferred to the CPU.

It has been conventionally practiced that the memory interface circuit controls a process of reading from a memory by switching between a normal read operation and a burst read mode, whereby an average memory access time is shortened.

Patent Literature 1 discloses a technique in which a burst access is controlled based on the difference between an addressing mode of a bus master and an addressing mode of a memory.

CITATION LIST

Patent Literature

Patent Literature 1: Japanese patent application publication No. 2008-59565

SUMMARY OF INVENTION

Technical Problem

In general, when a start address of data to be read is output to a memory operating in a burst mode, data read is not started immediately but after a predetermined time delay (referred to below as charge time in the description). Such charge time also occurs in Patent Literature 1.

The charge time is some fixed time period that depends on a memory device for the following reason. The fixed time period is taken, at start of the memory read operation, to control voltage applied to storage cells within a memory. In NOR flash memory, for instance, voltage of storage cell transistors is controlled to change conductivity of the transistors, whereby data read becomes possible. The conductivity change takes approximately 100 nanoseconds. It is said that 100 nanoseconds are the shortest time possible at present.

On the other hand, operation clocks of a CPU and a memory interface are becoming more and more speedy, making it faster to write data that is read from a memory into a RAM and the like, and reducing memory access time within a certain time period. This also results in an increasing proportion of the charge time to the memory access time within the certain time period. Accordingly, there is a need to reduce the charge time.

In view of the above-described problem, the present invention aims to provide a memory control device capable of reducing an average proportion of the charge time to the memory access time within the certain time period.

Solution to Problem

In order to solve the above-described problem, an aspect of the present invention provides a memory control device that reads data from a memory having a burst transfer function in response to a read request issued from a bus master, comprising: a read unit operable to issue a read command to the memory according to a first read request issued from the bus master to burst read a predetermined amount of data in the memory starting from an address specified by the first read request; a storage unit operable to continuously read and store data starting from an address that follows all of addresses of the data read by the read unit; a transfer unit operable to transfer the data read by the read unit to the bus master; and a determination unit operable to determine, upon newly receiving a second read request from the bus master, whether a difference between an address specified by the second read request and the address specified by the first read request falls within a predetermined range, wherein if the determination unit determines positively, the transfer unit transfers, from the storage unit to the bus master, the predetermined amount of data starting from the address specified by the second read request.

Advantageous Effects of Invention

With the above-described configuration, the memory control device of the present invention continues the data read from the memory and stores the read data even after a burst transfer irrespective of with or without a new read request. If a new read request is received from the bus master, and further if the address specified by the new read request lies within a predetermined range of the address specified by the previous read request, the storage unit reads the data as specified by the new read request for transfer. Since the charge time does not occur with respect to the new read request in this case, the memory control device reduces a proportion of the charge time occurrable in the memory access time within the certain time period.

Further, if the storage unit has not yet completed the data read of data starting from the address specified by the second read request, the transfer unit may transfer the data to the bus master after waiting until the data read is completed.

This configuration allows the memory device to wait until the storage unit reads data and transfer the read data, even if the memory control has not yet read the data specified by the new read request from the memory at the timing of reception of the new read request. If the address specified by the new read request lies within the predetermined range of the previous address, the memory control device starts a data transfer more quickly than newly setting up an access to the memory with occurrence of the charge time. This is done by causing the storage unit to continue the data read, even if the memory control has not read the data specified by the new read request from the memory yet at the timing of reception of the new read request.

Optionally, the memory control device may further comprise a termination unit operable to terminate the data read of the storage unit if the determination unit determines negatively.

Alternatively, the memory control device may further comprise a termination unit operable to terminate the data read of the storage unit if a predetermined time has elapsed since reception of the first read request without receiving a new read request from the bus master.

Furthermore, the memory control device may further comprise a termination unit operable to terminate the data read of the storage unit if a predetermined time has elapsed after transfer of the data specified by the first read request is completed by the transfer unit without receiving a new read request from the bus master.

As described in the above configurations, since the memory control device includes the termination unit, the memory control device reduces power consumption by continuing the data read while preventing unwanted and endless continuation of data read.

DESCRIPTION OF EMBODIMENT

Embodiment

Description is given below of a memory interface, which is an embodiment of a memory control device of the present invention, and a system including the memory interface with reference with figures.

<Structure>

Figure 1:
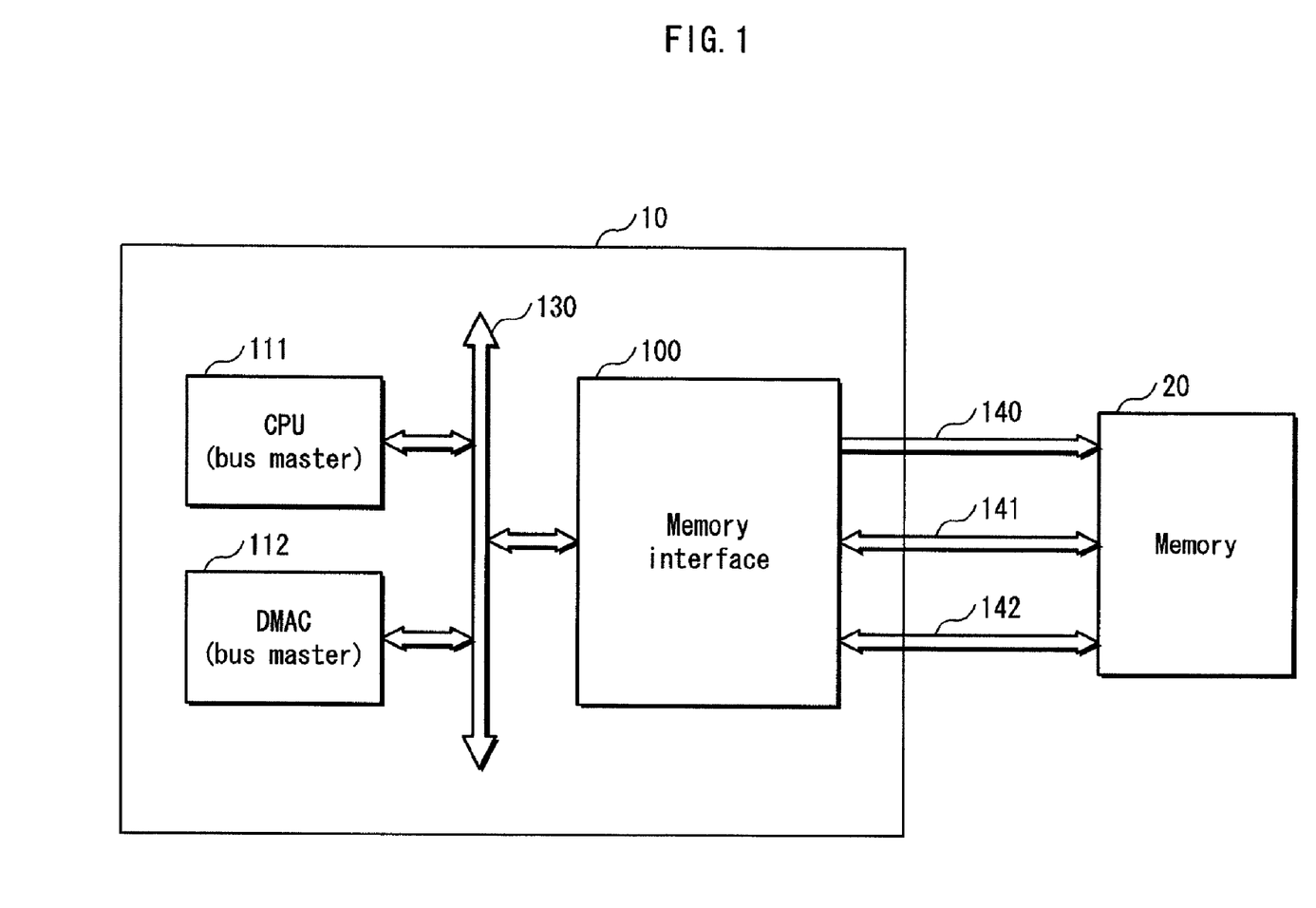
FIG. 1 is a system chart of a computer system including a memory interface according to an embodiment.

FIG. 1 shows a computer system including the memory interface 100 according to the embodiment.

As shown in FIG. 1, the computer system 10 includes the memory interface 100, a CPU 111, a DMAC (Direct Memory Access Controller) 112, and an internal bus 130. As can be seen from FIG. 1, the CPU 111, the DMAC 112, and the memory interface 100 are connected with one another via the internal bus 130. The memory interface 100 is connected to a memory 20 via a set of external buses. The memory 20 is configured to be removable from the memory interface 100.

The CPU 111 is a bus master and has a function of reading data from the memory 20 via the internal bus 130 and the memory interface 100.

In order to request a data read data from the memory 20, the CPU 111 issues a read request signal and an address signal to the memory interface 100 via the internal bus 130. The CPU 111 also has a function of receiving data corresponding to the issued address signal via the internal bus 130.

In a burst access mode in which a burst transfer is executed, the CPU 111 receives from the interface 100 a predetermined amount of data starting from the address specified by the issued address signal. In order to read follow-on data (starting from an address that follows all of addresses of the received data), the CPU 111 specifies another address in the address signal by adding a predetermined address value to the previous specifying address. Here, the predetermined address value is determined depending on a data transfer amount in each burst transfer. For example, the predetermined address value is "16" (four words×four bursts) in a burst transfer in which 32-bit data (which equals to four words) is read in a burst for four successive times.

The DMAC 112 is another bus master and, as similar to the CPU 111, has the function of reading data from the memory 20 via the internal bus 130 and the memory interface 100.

The memory interface 100 is the memory control device for controlling a data read from the memory 20. The memory interface 100 has functions of receiving the data read requests issued by the CPU 111 and the DMAC 112 via the internal bus 130, reading data from the memory 20 via an external bus 140, and transferring the read data to the CPU 111 and the DMAC 112.

Figure 2:
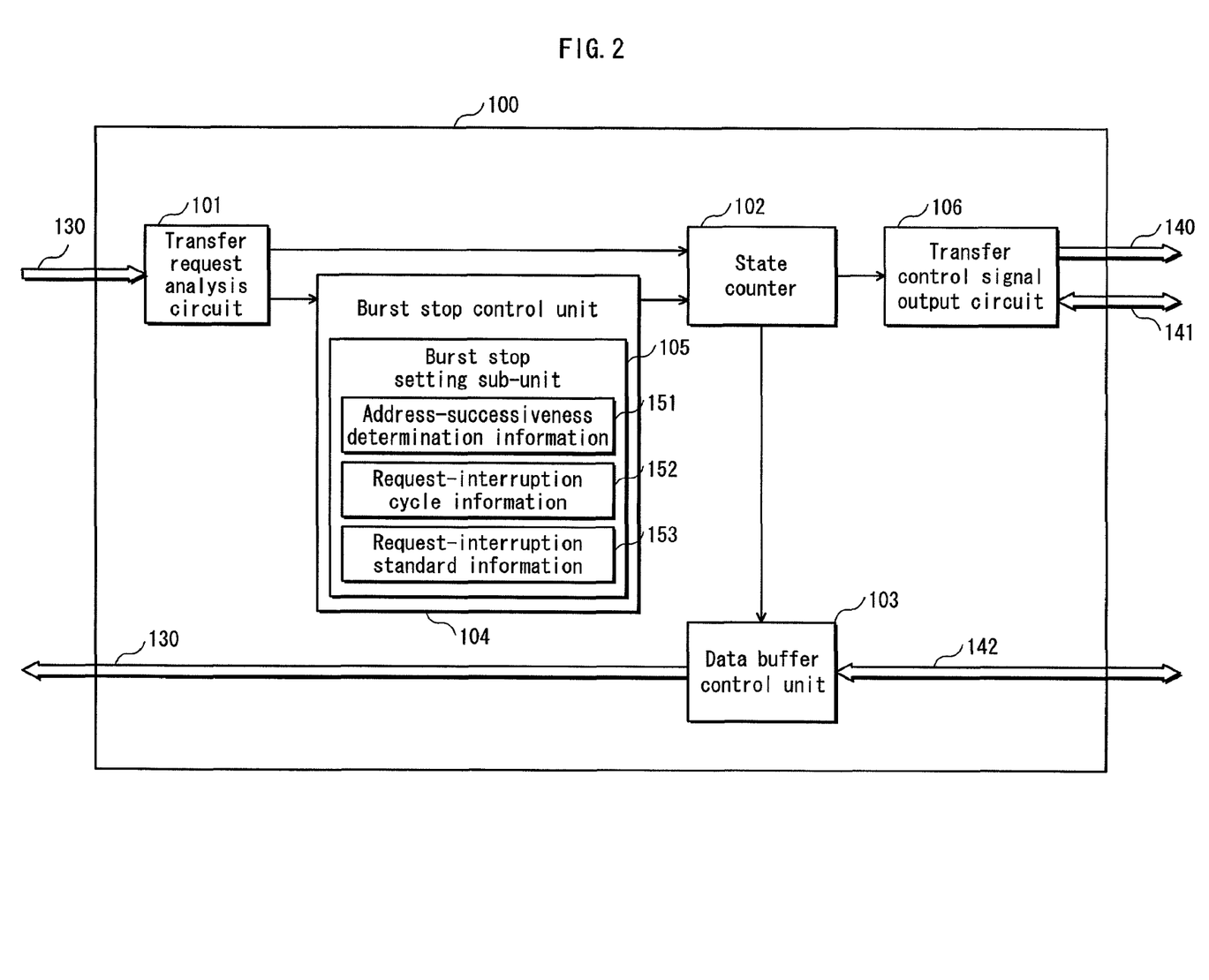
FIG. 2 is a function block diagram showing a function structure of the memory interface.

FIG. 2 is a function block diagram showing a function structure of the memory interface 100 in the details.

As shown in FIG. 2, the memory interface 100 includes a transfer request analysis circuit 101, a state counter 102, a data buffer control unit 103, and a burst stop control unit 104.

The transfer request analysis circuit 101 has the following three functions. One is to receive from the CPU 111 or the DMAC 112 the read request containing the read address and the transfer size. Another is to convert the read address contained in the read request to a memory address. The other one is to send the memory address acquired through conversion and the transfer size contained in the read request to the state counter 102 and the burst stop control unit 104. In this embodiment, the read address contained in the read request is a read start address in a burst transfer.

The burst stop control unit 104 includes a burst stop setting sub-unit 105. The burst stop control unit 104 has functions of generating a burst stop request according to information held in the burst stop setting sub-unit 105, and sending the generated burst stop request to the state counter 102. The generation of the burst stop request is performed if the burst stop control unit 104 determines that the successive reception of read requests is interrupted. The determination that the successive reception of read requests is interrupted is made under one of the following two conditions.

(1) In one case, subsequent to the issue of a first read request by the bus master and data transfer from the memory 20 to the bus master according to the data request, a second read request is issued. The above-described determination is made if a difference between the read address specified by the second request and the read address specified by the first request falls out of a predetermined range.

(2) In the other case, subsequent to the issue of a read request by the bus master and data transfer from the memory 20 to the bus master according to the data request, a new read request is not received within a predetermined time period.

The burst stop setting sub-unit 105 holds various types of information for the burst stop control unit 104 to determine whether any of the above-described conditions hold. The various types of information are, for example, address-successiveness determination information 151, request-interruption cycle information 152, and request-interruption standard information 153.

The address-successiveness determination information 151 is the information for determining the successiveness of read addresses specified by two successive (temporally adjacent) read requests. The address-successiveness determination information 151 is a predetermined address value. The burst stop control unit 104 determines that the two read requests are successive, if a difference between the address value specified by the latest read request and the read address specified by the previous read request is less than or equal to the predetermined address value indicated by the address-successiveness determination information 151. On the other hand, the burst stop control unit 104 determines that the two read requests are not successive, if a difference between the address value specified by the latest read request and the read address specified by the previous read request is greater than the predetermined address value indicated by the address-successiveness determination information 151. With the negative determination, the burst stop control unit 104 sends a burst stop request to the state counter 102. In a concrete example, the predetermined address value indicated by the address-successiveness determination information 151 is "32" ("0x20" in hexadecimal notation), and the read address specified by the previous read request is "1000". If the read address specified by the latest read request is "1032", it is determined that the two read requests are successive. However, if the read address specified by the latest read request is "1064", it is determined that the two read requests are not successive. Note that the predetermined address value indicated by the address-successiveness determination information 151 is set to "32" in this example according to the following reason. In this example, it is assumed that the bus master performs, a burst access of eight 32-bit (corresponding to four words) data transfers (four words×eight bursts=32).

The request-interruption cycle information 152 is information indicating the predetermined time period used in the above-described condition (2). In this example, the information is determined by the number of operation clock cycles of the memory interface 100, such as "400 cycles". The 400 cycles are obtained by counting the clock cycles of a CPU having a frequency of 400 Hz in one second.

The request-interruption standard information 153 is the information for defining the timing of starting to count the number of cycles indicated by the request-interruption cycle information 152. If the condition defined by the request-interruption standard information 153 becomes satisfied, the burst stop control unit 104 starts to count the number of cycles indicated by the request-interruption cycle information 152. Once the counting of the number of cycles has been completed without receiving a new read request, the burst stop control unit 104 generates a burst stop signal. In the example, the timing of starting to count as defined by the request-interruption standard information 153 is set to the timing in which data transfer in response to the received read request is completed.

Figure 3:
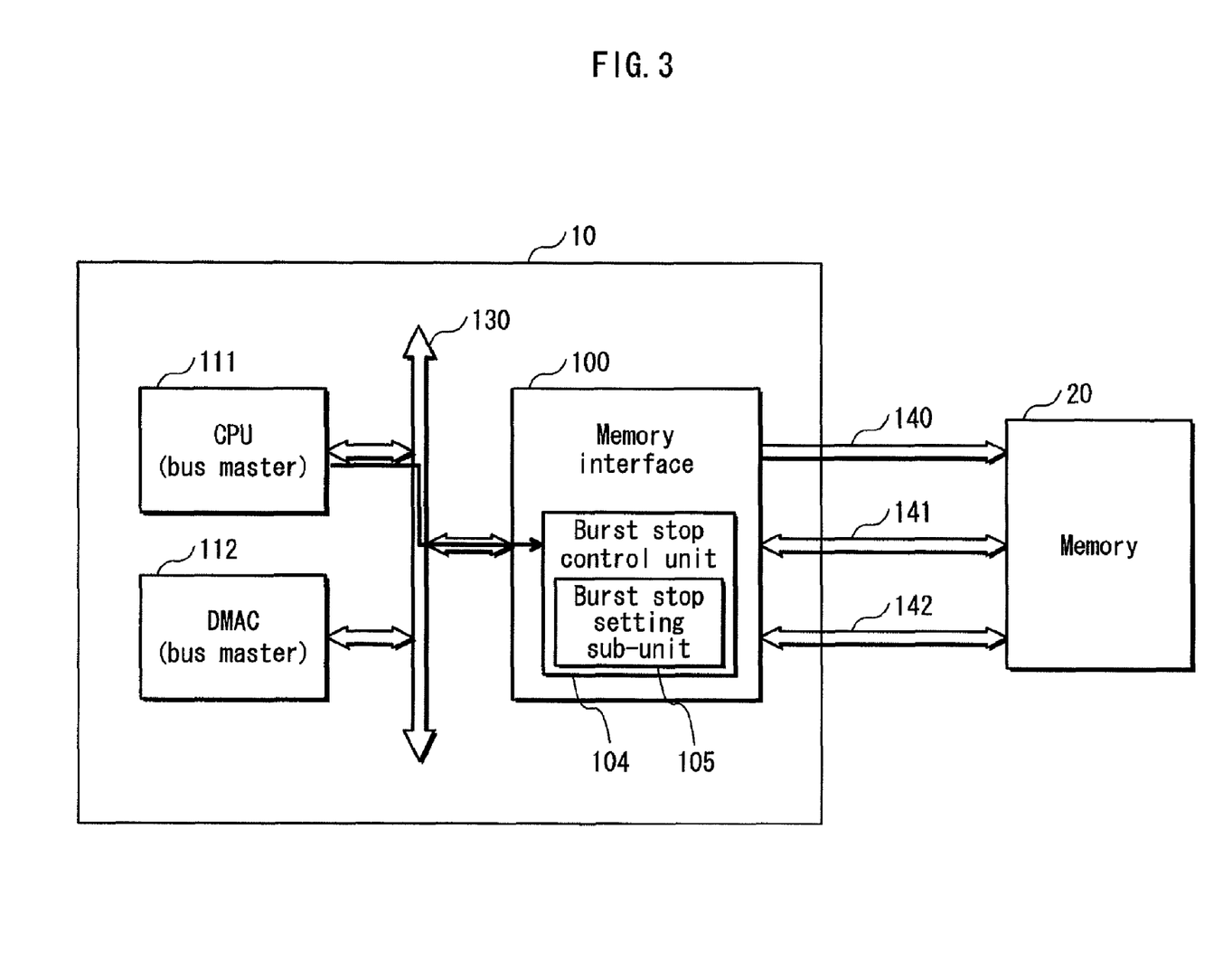
FIG. 3 schematically shows a process of setting a burst stop control unit according to the embodiment.

As shown in FIG. 3, the various types of information stored in the burst stop setting sub-unit 105 is set by the CPU 111 via the internal bus 130 prior to the execution of data transfer. The burst stop setting sub-unit 105 herein may be realized by a writable storage device, such as a flip-flop and an SRAM.

A description is further given with reference to FIG. 2 again. The state counter 102 has a function of sending state information and the memory address to the transfer control signal output circuit 106, according to the read request sent from the transfer request analysis circuit 101. The read request contains the memory address and the transfer size.

The state information includes any one of "memory access start", "charging", and "data read start". The state counter 102 also has a function of sending the state information indicating "burst stop" to the transfer control signal output circuit 106, in response to the burst stop request received from the burst stop control unit 104.

The data buffer control unit 103 stores data that has been read from the memory 20 via an external data bus 142. The data buffer control unit 103 also has a function of transferring, to the bus master via the internal bus 130, the read data corresponding to the address in the buffer read request sent from the state counter 102. Note that the data buffer control unit 103 has a faster read speed than the memory 20.

The transfer control signal output circuit 106 has the following two functions. One is to output a burst transfer control signal to the memory 20 via an external transfer control signal bus 141 in accordance with the state information received from the state counter 102. The other is to output the address of requested data via an external address 140 so as to perform a data read. If the state information indicates "memory access start", the transfer control signal output circuit 106 starts to access the specified memory address in the memory 20. If the state information indicates "data read start", the transfer control signal output circuit 106 causes the memory 20 to continuously output data starting from the specified address to the external data bus the set of external buses 140 sequentially. The transfer control signal output circuit 106 keeps on issuing requests for the memory 20 to output data, while incrementing the memory address value by one on each request until the transfer control signal output circuit 106 receives the state information indicating "burst stop". By doing so, the transfer control signal output circuit 106 causes the data specified by the read request and the follow-on data to be output from the memory sequentially. If the state information indicates "burst stop", the transfer control signal output circuit 106 terminates the output of data to an external data bus 142.

With reference to FIG. 1 again, the memory 20 is a NOR flash memory that has the following two functions. One is to output the data starting from a specified address to the external data bus 142 under control of the memory interface 100. The other is to terminate the output of data in response to the burst stop signal from the memory interface 100.

<Operations>

Figure 4:
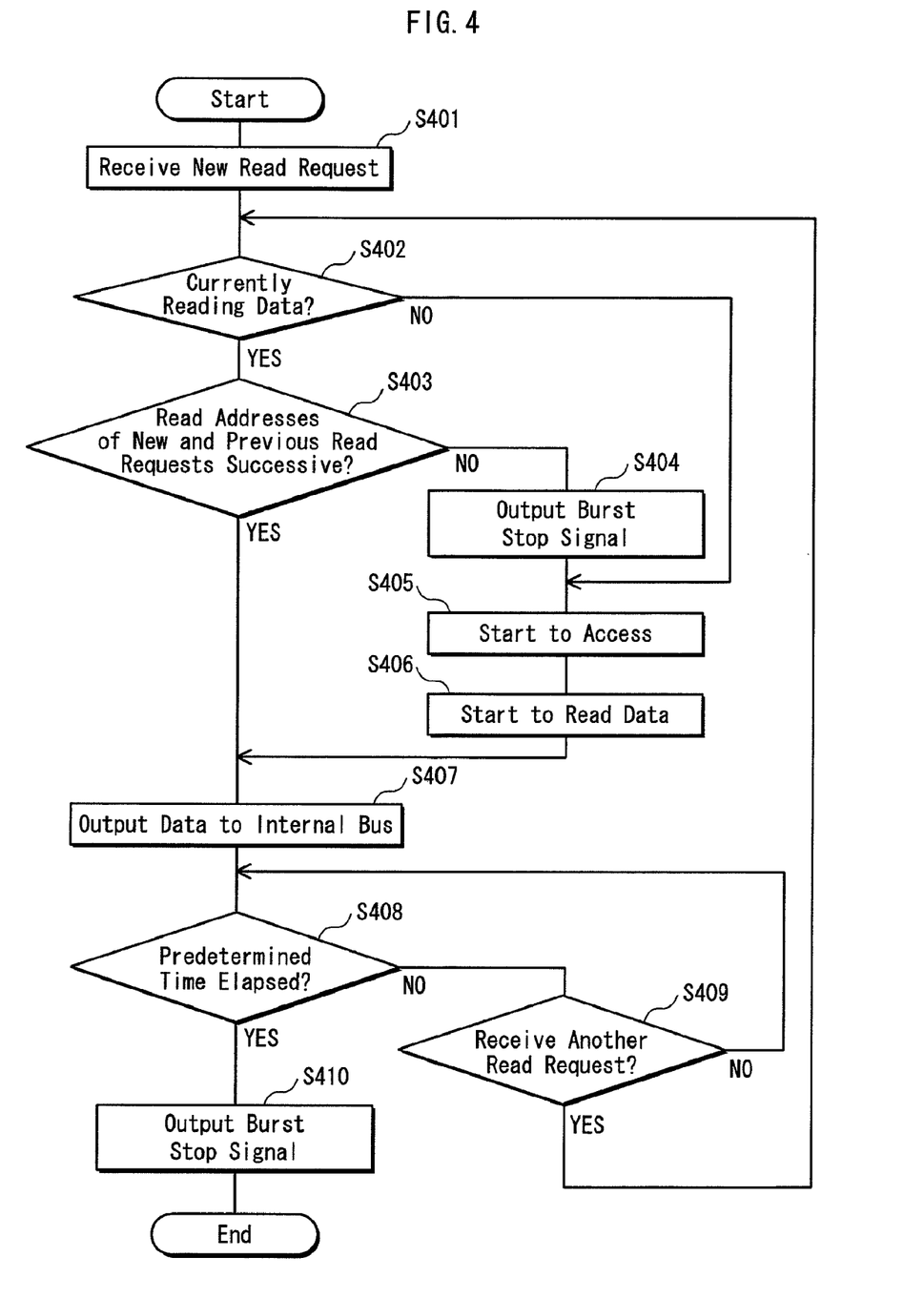
FIG. 4 is a flowchart showing operations of the memory interface in a burst read access.

Firstly, a description is made of the basic operations of the memory interface 100 with reference to the flowchart of FIG. 4. Secondly, a description is made of concrete examples as to how data transfer is performed in accordance with the operations in the flowchart of FIG. 4.

The flowchart of FIG. 4 shows the operations of the memory interface 100 in receiving a read request from the bus master.

The memory interface 100 receives a new read request from the bus master (Step S401).

The transfer request analysis circuit 101 analyzes the received read request, converts a read address specified in the read request to a memory address, and sends the read request containing the memory address and the transfer size to the burst stop control unit 104 and the state counter 102.

The burst stop control unit 104 determines whether the memory interface 100 is currently reading data from the memory 20, by referring to whether the latest burst transfer control signal output from the transfer control signal output circuit 106 to the memory 20 is a read start signal or a burst stop signal (Step S402).

If it is determined that the memory interface 100 is currently reading data from the memory 20, that is, the latest control signal output from the transfer control signal output circuit 106 to the memory 20 is a read start signal (YES in Step S402), the burst stop control unit 104 makes another determination. Specifically, the burst stop control unit 104 determines whether a difference between the read address specified by the received read request and the read address specified by the previous read requests is less than or equal to the predetermined address value indicated by the address-successiveness determination information 151 (Step S403). By doing so, the burst stop control unit 104 determines whether the read addresses of the new and previous read requests are successive. Meanwhile, if it is determined that the memory interface 100 is currently not reading data from the memory 20 (NO in Step S402), processing jumps to Step S405.

If it is determined that the difference in address value is less than or equal to a predetermined address value (YES in Step S403), the burst stop control unit 104 transfers the received read request to the state counter 102. Upon receiving the read request from the transfer request analysis circuit 101 and the burst stop control unit 104, the state counter 102 sends a signal containing the memory address and the transfer size to the data buffer control unit 103. In response to the signal, the data buffer control unit 103 outputs the stored data specified by the memory address for the transfer size. Meanwhile, if the data corresponding to the memory address is not stored, the data buffer control unit 103 waits until the corresponding data is output to the external data bus 142, acquires the data on the external data bus 142, and outputs the acquired data to the internal bus 130 (Step S407).

On the other hand, if it is determined that the difference in address value is greater than the predetermined address value (NO in Step S403), the burst stop control unit 104 outputs a burst stop request to the state counter 102.

Receiving the read request and the burst stop request from the transfer request analysis circuit 101 and the burst stop control unit 104 respectively, the state counter 102 firstly sends a signal containing the state information indicating "burst stop" to the transfer control signal output circuit 106. In response to the signal containing the state information indicating "burst stop", the transfer control signal output circuit 106 outputs a burst stop signal to the memory 20 so as to cause the memory 20 to terminate the output of data to the external data bus 142 (Step S404).

Subsequently, the state counter 102 sends, to the transfer control signal output circuit 106, a read request containing the state information indicating "memory access start", the memory address, and the transfer size according to the read request received from the transfer request analysis circuit 101. The transfer control signal output circuit 106 starts to access the memory address in the memory 20 specified by the received read request (Step S405).

After the charge time has elapsed, the transfer control signal output circuit 106 instructs the memory 20 to output the stored data starting from the specified memory address in order of address to the set external data buses (Step S406).

The data buffer control unit 103 acquires the data that has been output to the external data bus 142 and is specified by the received read request, and outputs the acquired data to the internal bus 130 (Step S407). The bus master receives the output data.

The data output to the internal bus 130 by the data buffer control unit 103 triggers the burst stop control unit 104 to move on to the next step. Specifically, based on the timing defined by the request-interruption standard information 153, the burst stop control unit 104 starts to count the number of cycles indicated by the request-interruption cycle information 152 (Step S408).

If a new read request is received while the burst stop control unit 104 is counting the number of cycles (NO in Step S408, YES in Step S409), processing goes back to Step S402.

If no read request is newly received before the burst stop control unit 104 finishes counting the number of cycles (YES in Step S408), the burst stop control unit 104 goes on to the next step. Specifically, the burst stop control unit 104 sends a burst stop request to the state counter 102. From the state counter 102, the transfer control signal output circuit 106 receives a signal containing the state information indicating "burst stop". As a result, the transfer control signal output circuit 106 causes the memory 20 to terminate the output of data to the external data bus 142 (Step S410) to bring the processing to an end.

This concludes the description of the operations of the memory interface 100 in receiving a read request so far.

Next, with reference to FIGS. 5 to 7, a description is given below of concrete examples of a data transfer timing according to the operations of the memory interface 100 in the flowchart of FIG. 4.

Figure 5:
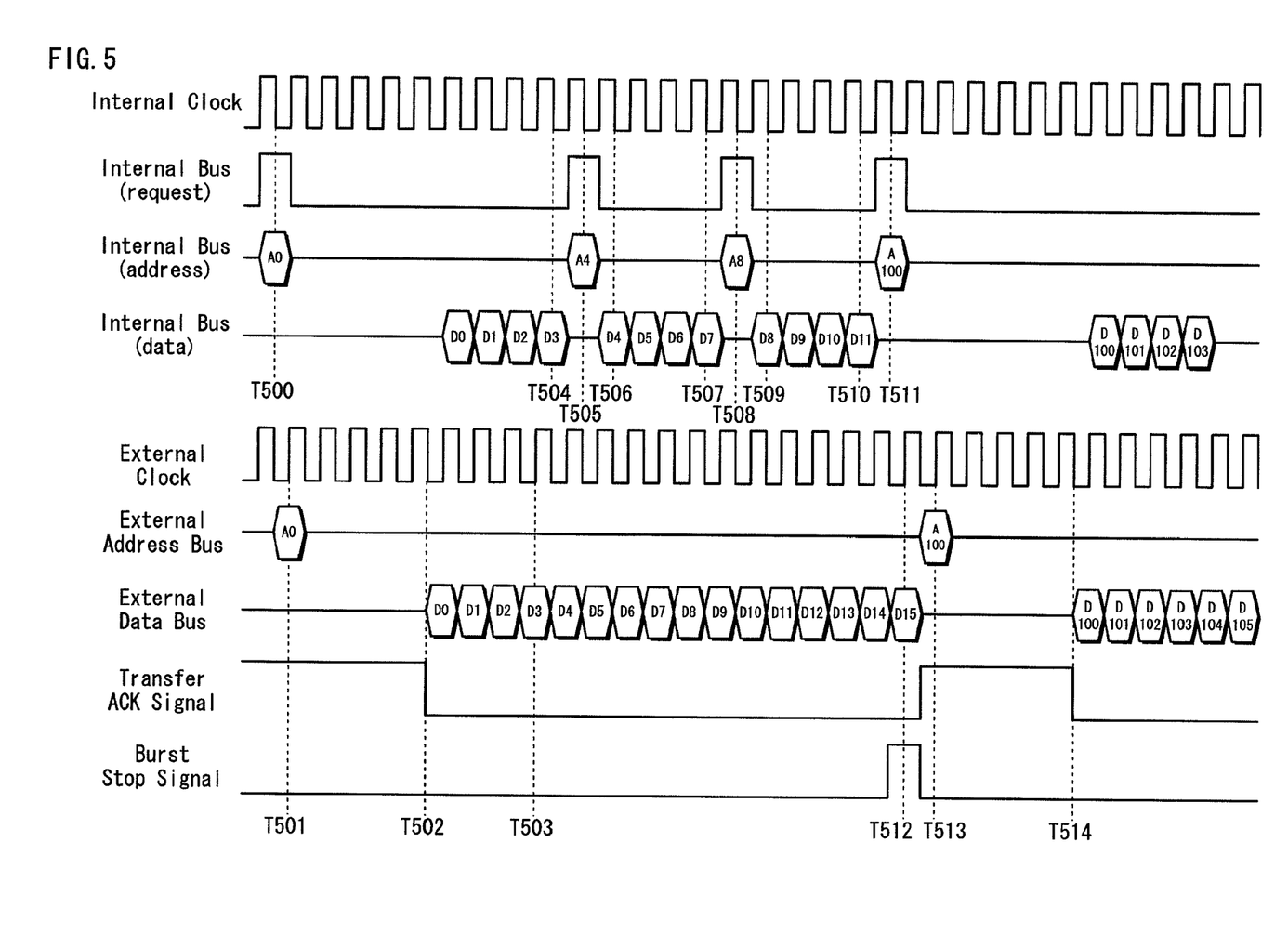
FIG. 5 is a timing diagram showing an example of a burst read access controlled by the memory interface.
Figure 6:
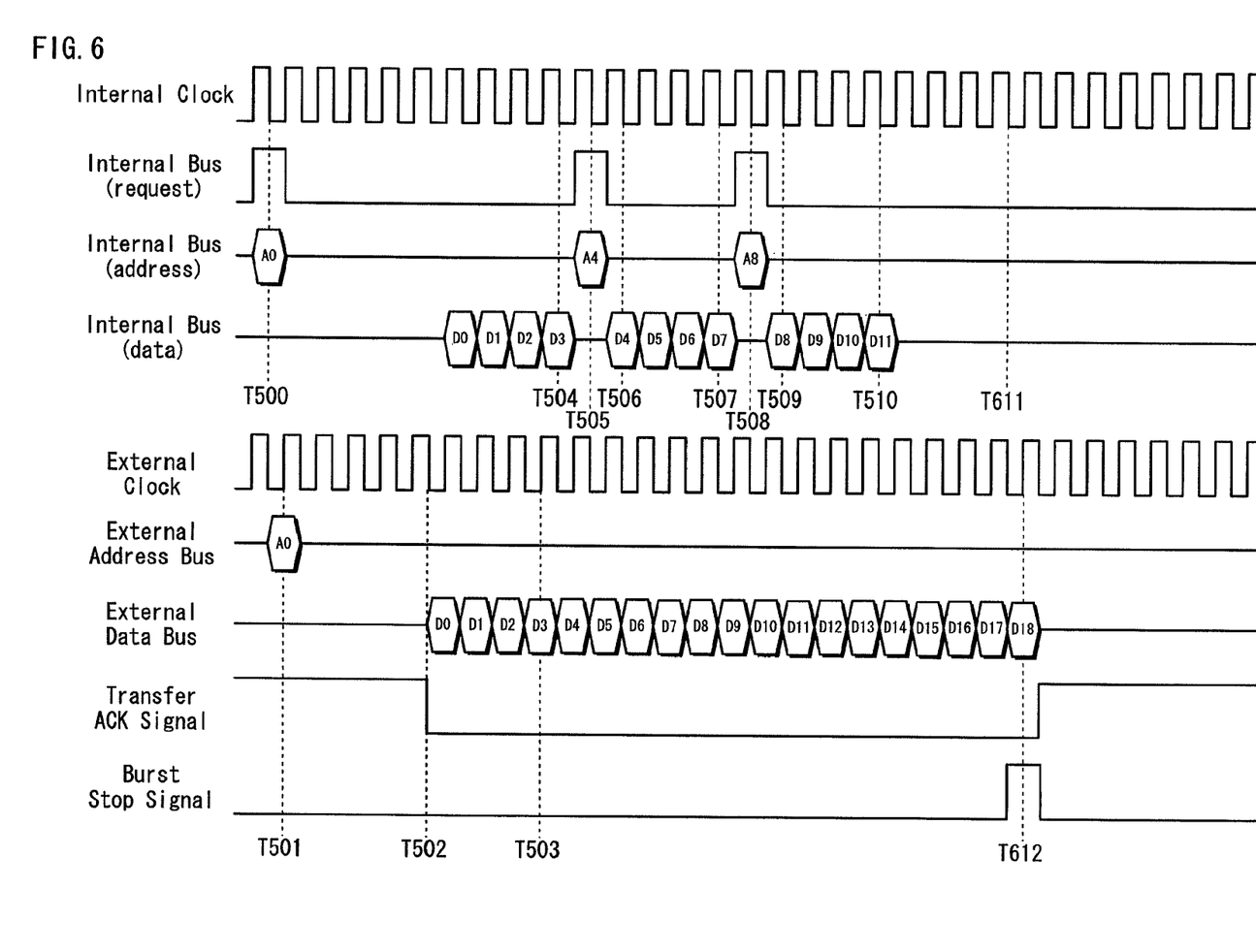
FIG. 6 is a timing diagram showing another example of a burst read access in the case in which the read access is terminated due to a time-out.
Figure 7:
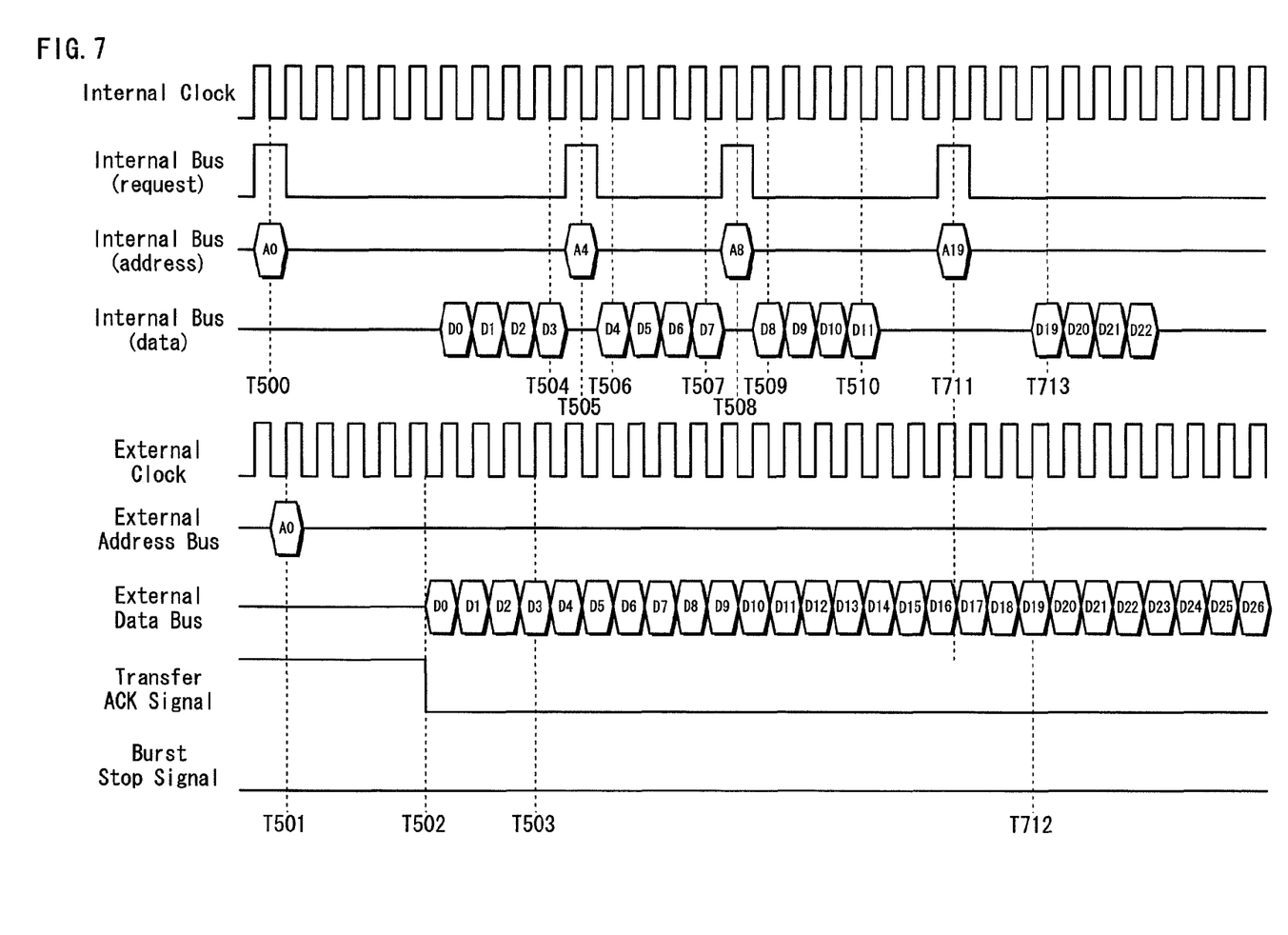
FIG. 7 is a timing diagram showing another example of a burst access read in the case in which data corresponding to a requested address is read shortly after the request.

In burst transfers shown in FIGS. 5 to 7, read addresses issued by the bus master are identical to memory addresses issued by the memory interface 100 in order to make it easy to understand. These addresses are represented by A plus numbers, such as "A0", "A1" . . . , and different numbers refer to different addresses. Note that these addresses are arranged in the memory 20 in order of the number.

Data pieces to be transferred are represented by D plus numbers, such as "D0", "D1" . . . , and the numbers of the data correspond one-to-one with the numbers of address. This means that the read data "D2" corresponds to the address "A2".

Further, the data size to be burst transferred is set to be a size of data corresponding to four addresses in the example. In other words, the memory interface 100 transfers the series of data "D0" to "D3" in a burst, in the case in which the bus master specifies the address "A0" as the read start address.

Furthermore, the description is given based on the following settings. The address-successiveness determination information 151 is set to be the address value of "12". The request-interruption cycle information 152 is set to be 4 clock cycles. The request-interruption standard information 153 is set to define that the count timing should not precede completion of read data transfer corresponding to a read request.

Moreover, in FIGS. 5 to 7, the description is initially given of the state prior to the execution of data read.

With the above-described conditions, concrete examples of the operations of the memory interface 100 are looked at below.

FIG. 5 shows an example of a burst data transfer according to the present invention. The four signals in the upper part of FIG. 5 are exchanged between the bus master and the memory interface 100. The five signals in the bottom part of FIG. 5 are exchanged between the memory interface 100 and the memory 20. Internal and External Clocks indicate operation clocks, and these two clocks are synchronized in the example. Internal Bus (request) indicates read request signals issued by the bus master to the memory interface 100. The highs in the read request signals indicated by Internal Bus (request) show timings in which read requests are issued. Internal Bus (address) indicates addresses of data that the bus master issues to request to read, as well as timings in which each of the addresses are issued. Internal Bus (data) indicates data transferred from the memory interface 100 to the bus master, as well as the transfer timings. External Address Bus indicates addresses issued from the memory interface 100 to the memory 20, as well as the issue timings. External Data Bus indicates data output from the memory 20 to the external data bus 142 in response to the memory interface 100. Transfer ACK Signal is a signal for notifying that transfer is in execution, and highs in Transfer ACK Signal show timings in which data transfer is not in execution. Burst Stop Signal indicates a burst stop signal issued from the memory interface 100 to the memory 20. Upon detecting that Burst Stop Signal becomes in high, the memory 20 terminates data output to the external data bus 142.

In the example of a data transfer shown in FIG. 5, continuous data reads are performed, so that occurrence of the charge time is limited with respect to read requests specifying successive addresses for a second time or later. In the example of the data transfer, it is also shown that a difference between the read address specified by the latest read request and the read address specified by the previous read request is greater than the address value defined by the address-successiveness determination information 151.

At time T500, the memory interface 100 receives a read request specifying the address "A0" as a read start address.

In response to the read request, the memory interface 100 starts to access the address "A0" in the memory 20 at time T501 a half clock later than the time T500.

Once the charge time between time T501 and time T502 has elapsed, data starting from the read address "A0" (i.e. a series of data corresponding to the read start address "A0"), that is, data "D0", "D1" . . . starts to be output to the external data bus 142.

Even after time T503 at which the output of the series of data "D0" to "D3", which corresponds to the transfer size in this burst transfer, is completed, the memory 20 continues to output the follow-on data ("D4", "D5" . . . ) to the external data bus 142. This is because that the memory 20 does not receive a burst stop signal yet.

On the other hand, after time T504 at which the bus master receives the series of data "D0" to "D3", which is a unit of a burst transfer corresponding to the read start address "A0", the bus master issues a next read request. At time T505, the memory interface 100 receives the data read request specifying the read address "A4" as the read start address.

At this point, the data "D4" corresponding to the address "A4" is already stored in the data buffer control unit 103. Therefore, as early as one clock after T505 at time T506, a transfer size of data starting with the data "D4" starts to be output to the internal bus 130.

Upon receiving the data "D7" at time T507, the bus master issues another read request specifying the read address "A8" as the read start address to the memory interface 100.

In response, the memory interface 100 outputs a series of data "D8" to "D11" to the internal bus 130.

Upon receiving the data "D11" at time T510, the bus master issues to the memory interface 100 yet another read request specifying the address "A100" as the read start address.

The memory interface 100 receives the latest read request, and determines that the two read addresses specified by the latest and previous read requests are not successive, by subtracting the read address "A8" in the previous read request from the read address "A100" in the latest read request. In this case, a difference between the two read addresses are "92", and this is greater than the predetermined address value "12" set in the address-successiveness determination information 151. The memory interface 100 thus issues a burst stop signal at time T512 to the memory 20 to terminate the data read continued from time T502. At time T513, the memory interface 100 newly executes a memory access to the read start address "A100". In this case, the memory access causes the charge time to occur again, as shown between time T513 and time T514.

As shown in FIG. 5, by causing the memory interface 100 to read from the memory 20 successively, the embodiment makes it possible to limit occurrence of the charge time that would have been conventionally inevitable for the read request at time T505 and the read request at time T508.

FIG. 6 shows another example of a data transfer in which a predetermined time has elapsed after the latest data transfer.

Since state transitions from time T500 to time T510 in FIG. 6 are identical to those in FIG. 5, a description is omitted here.

Upon finishing transferring the data corresponding to the address "A8" at time T510, the burst stop control unit 104 of the memory interface 100 starts to count the predetermined number of cycles as indicated by the request-interruption cycle information 152.

If four clock cycles, as indicated by the request-interruption cycle information 152, are counted in a time period in which no read request is newly received, the burst stop control unit 104 generates a burst stop signal. This results in the output of the burst stop signal from the transfer control signal output circuit 106 at time T612. Thus, upon reading the data "D18", the transfer control signal output circuit 106 terminates the data reads continued from time T502. At the same time, the data buffer control unit 103 discards data stored therein.

In FIG. 6, the read data from "D12" to "D18" is wasted in the end. However, by causing the memory interface 100 to count four clock cycles between T510 and time T611 so as to provide a burst stop, the present invention prevents occurrence of unwanted data reads.

FIG. 7 shows another example of a data transfer in which (i) a difference between the read address specified by the latest read request and the read address specified by the previous read request is less than the address value indicated by the address-successiveness determination information 151, and further in which (ii) data to be read is not stored in the data buffer control unit 103 yet.

Since state transitions from time T500 to time T510 in FIG. 7 are identical to those in FIG. 5, a description is omitted here.

After completing transfer of the series of data corresponding to the address "A8" at time T510, the memory interface 100 starts to count four cycles as indicated by the request-interruption cycle information 152. However, the memory interface 100 newly receives a read request from the bus master at time T711. A difference between the read address "A19" specified by the read request received at time T711 and the read address "A8" specified by the previous read request is "11". This is less than the predetermined address value set in the address-successiveness determination information 151. Accordingly, it is determined that the read request received at time T711 is successive.

Nevertheless, at the point of time T711, the data "D19" of the read address "A19" is not read from the memory 20 yet.

Therefore, the memory interface 100 continues to read data while incrementing the address value by one at a time. At time T712, the data "D19" is read, whereby the data "D19" corresponding to the data request "A19" starts to be transferred from time T712.

Thus, the address-successiveness determination information 151 is set to a greater address value than "4" that simply corresponds to the transfer size or a difference in the memory address so that the data read is continued. As a result, the memory interface makes it possible to reduce access time compared with the case in which an access is newly started with occurrence of the charge time.

Figure 8:
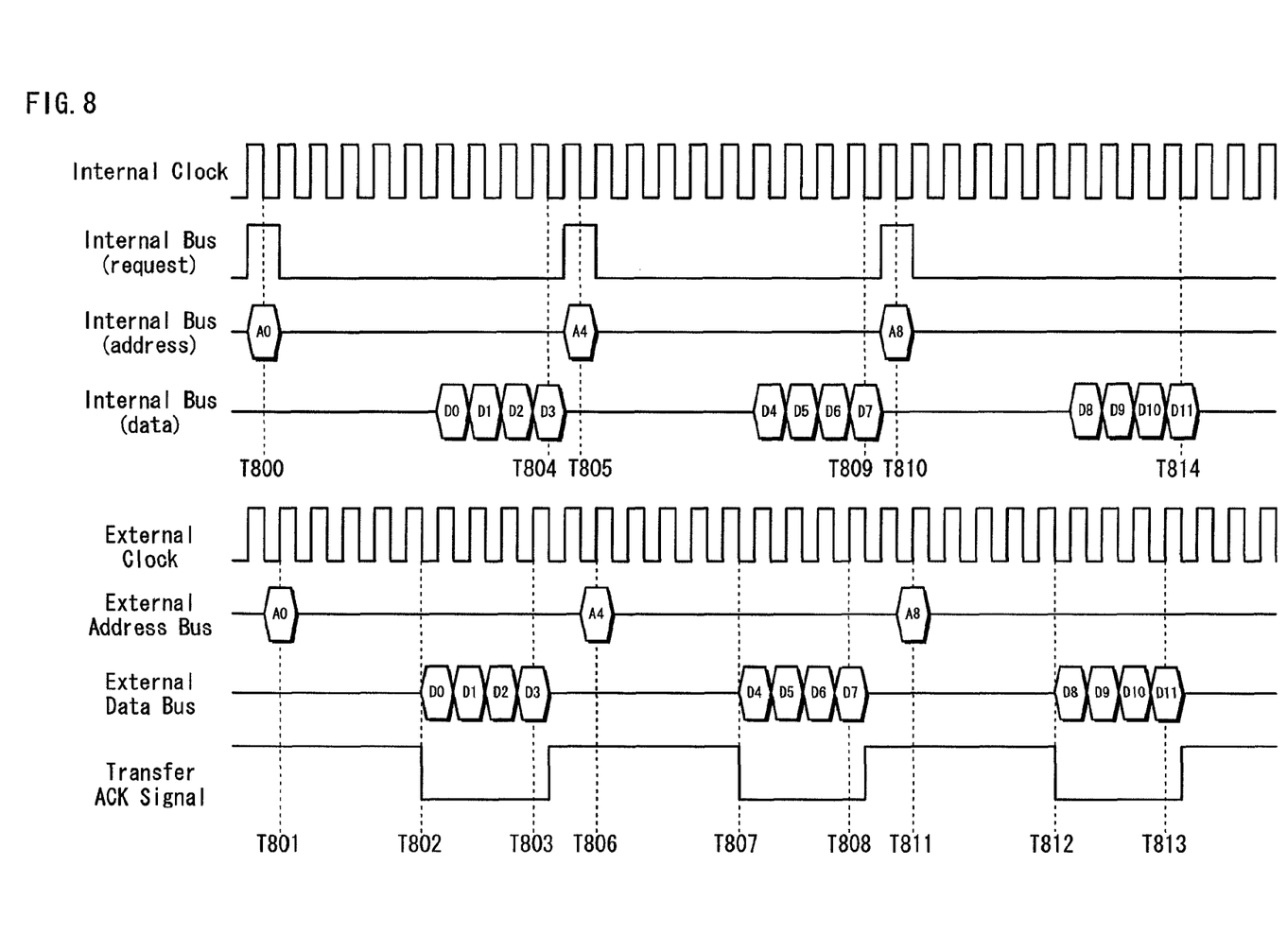
FIG. 8 is a timing diagram showing an example of a conventional burst access read.

FIG. 8 shows a concrete example of data transfer timings in a conventional burst transfer, in order to clarify differences between data transfer timings of the present invention. Note that, in the conventional art example of FIG. 8 as well, each charge time corresponds to four clock cycles, and the transfer size in each burst transfer corresponds to four addresses of data.

As shown in FIG. 8, upon receiving a read request specifying the read start address "A0" at time T800, a memory interface starts to access a memory. After charge time between time T801 and time T802, the memory interface starts to read data from the memory at time T802. At time T803, the memory interface finishes reading data in a unit of a burst transfer. At time T804, transfer of the data from the memory interface to a bus master is completed.

Upon receiving a new read request at time T805, the memory interface takes the same steps as those between time T800 and time T804 during time between time T805 and time T809, so as to read data specified by the read request received at time T805. This also applies to another read request that is received at time T810.

As shown in FIG. 8, three successive read requests specifying the read addresses "A0", "A4", and "A8" are received in conventional art. It can be seen from FIG. 8 that the conventional data transfer takes 29 clocks in total, and involves occurrence of the charge time three times (between time T801 and time T802, time T806 and T807, and time T811 and time T812).

As shown in FIG. 5, on the other hand, the memory interface 100 according to the embodiment of present invention receives three successive read requests specifying the read addresses "A0", "A4", and "A8". It can be seen from FIG. 5 that the data transfer of the present embodiment takes 20 clocks in total, and involves occurrence of the charge time only once (between time T502 and time T503). Accordingly, it can be said that the memory interface 100 of the present invention ensures a transfer of the desired data to the bus master, while reducing the charge time so as to realize a decrease in access time.

Further, as shown in the FIG. 7, according to the embodiment it takes six clocks in total to transfer the data "D22" in response to a read request specifying the address "A19". This is shorter than 9 clocks that are required for each read request in conventional art. For example, it can be seen from FIG. 8 that in conventional art it takes nine clocks from reception of a read request at time T800 to transfer of the data "D3" at time T804.

<Recapitulation>

A memory interface according to the present invention continues to read the follow-on data corresponding to addresses which follow all of addresses of the transferred data, even after transferring to a bus master a series of data corresponding to a read request issued by the bus master. The continuation of data read is realized by incrementing the memory address value specified by the memory interface by one so that the corresponding data is read on each request. Upon reception of a new read request, and if it is determined that a difference between the read address specified by the new read request and the read address specified by the previous read request is within a predetermined address value, the memory interface automatically transfers the read data without being requested to do so by the bus master. Here, the charge time does not occur, since it is not necessary for the memory interface to reset the state of reading data from the memory based on the read address specified by the new read address. Accordingly, the memory interface 100 of the present invention allows limiting occurrence of the charge time that conventionally accompanies each of read requests received from the bus master within a predetermined time, as long as two successive read requests satisfy the above-described condition. The limited occurrence of the charge time leads to a limited memory access time, thereby resulting in a reduction of power consumption.

Due to recent developments in the performance and functions of home electrical appliances, such as mobile phones, digital televisions, and BD (Blu-ray Disc) recorders, higher and higher operation clock speeds are required to access a NOR flash ROM storing programs and data year by year. Moreover, due to ongoing improvements in the performance of CPUs, a cache-line size is increased. As a result, cache-line sized data cannot be read in a single burst access that only reads a conventionally fixed size of data. In other words, in conventional art, it is necessary to read cache-line sized data in several bursts with occurrence of the charge time for the several times.

Figure 10:
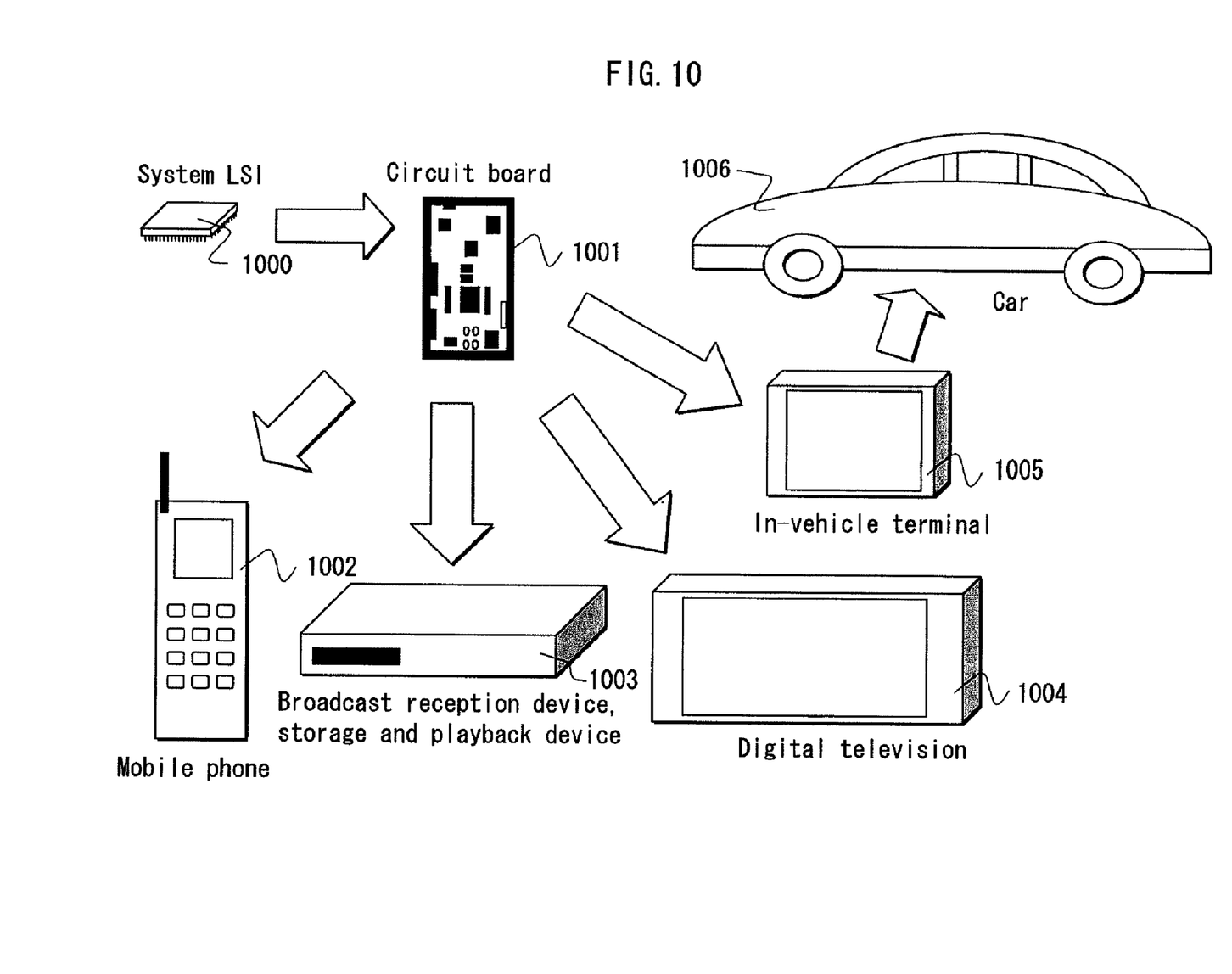
FIG. 10 shows implementation examples of the memory interface.

Accordingly, as shown in FIG. 10, the memory interface 100 may be implemented in a system LSI (Large Scale Integrated) circuit 1000 for example. It is effective to mount the system LSI 1000 on a circuit board 1001, and mount the circuit board 1001 in broadcast reception devices/storage and playback devices 1003 and various digital home appliances. Typical examples of the broadcast reception devices/storage and playback devices 1003 include a mobile phone 1002, a DVD (Digital Versatile Disc) player, and a BD recorder. A digital television 1004 and an in-vehicle terminal 1005, such as a car navigation system installed in a car 1006, are typical examples of the digital home appliances.

<Supplementary Notes>

Although the present invention has been described according to the above embodiment, it is natural that the present invention is limited to this embodiment. The following modifications are also within the scope of the present invention.

(1) Although in the embodiment the memory 20 is removable from the memory interface 100 in the computer system 10, the present invention is not limited to this. Any memory readable by the memory interface 100 may be used as the memory 20. The memory 20 may be built in the memory interface 100 in advance.

(2) Although the embodiment only describes a data read from the memory 20, the bus masters the CPU 111 and the DMAC 112 may have a function of transferring a write request together with data to be written to the memory interface 100, and the memory interface 100 may have a function of writing the specified data to the memory 20.

(3) Although in the embodiment the burst stop setting sub-unit 105 is provided in the burst stop control unit 104, it is suffice for the burst stop control unit 104 to have a function of reading information in the burst stop setting sub-unit 105. So, the burst stop setting sub-unit 105 may be provided outside the burst stop control unit 104.

(4) Although in the embodiment the information in the burst stop setting sub-unit 105 is set by the CPU 111, the information may be set by any compositional element other than the CPU 111.

Figure 9A:
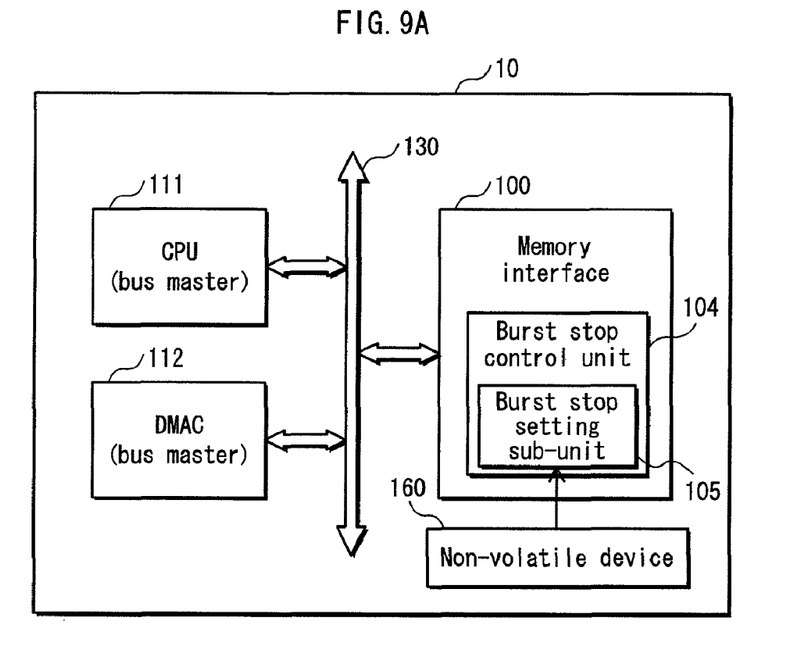
FIG. 9 schematically shows how the burst stop control unit can be set differently from the embodiment.

As shown in FIG. 9A for example, the computer system 10 may have a non-volatile device 160 that stores various types of information to be held in place of the burst stop setting sub-unit 105. This structure can be cost-effective if the memory 20 of a specific type is connected to the memory interface 100, and there is no change in timings of occurrence of the burst stop signal.

Figure 9B:
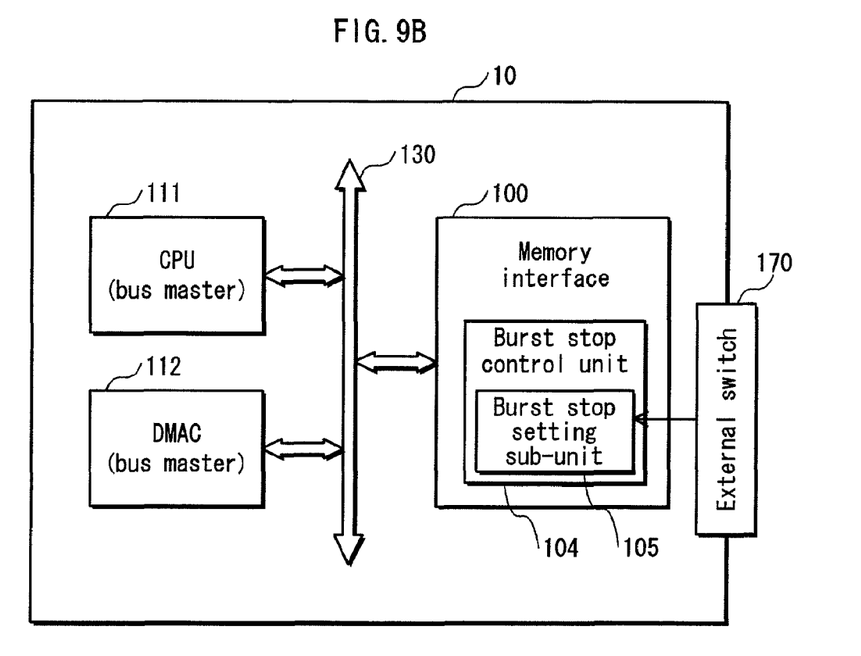

Alternatively, as shown in FIG. 9B, an external switch 170, such as a jumper pin and a dip switch, may be provided to set various types of information held in the burst stop setting sub-unit 105. This structure allows changing contents of the information held in the burst stop setting sub-unit 105 without changing software.

(5) Although in the embodiment the request-interruption standard information 153 is set to indicate the timing when a transfer of data specified by a read request to the bus master is completed, the present invention is not limited to this. It is suffice for the request-interruption standard information 153 to define the timing of starting to count the number of cycles indicated by the request-interruption cycle information 152 in the embodiment. The timing may be when a read request is received from the bus master or when a transfer of read data in response to the first read request is started, for example. One thing to be noted is that the number of cycles in the request-interruption cycle information 152 needs to be adjusted in consideration of charge time and operation clocks according to thus defined timing.

(6) Although in the embodiment the memory 20 is a NOR flash memory, the memory 20 does not have to be a NOR flash memory as long as the memory 20 includes a burst transfer function and is a type that involves charge time for a data read.

(7) Although not particularly described in the embodiment, the bus master may further transmit information defining a timing to generate a burst stop signal to the memory interface 100, at the beginning of a read request transmission step.

For example, in issuing a read request, the bus master may notify how many times successive addresses are to be specified after the issued read request. The memory interface 100 may continue to read data sequentially for the notified number of times, and then terminate the data read by generating a burst stop signal.

This enables decreasing the number of a data read outside the range of data specified by the issued read requests (from the data "D12" to the data "D18" in FIG. 6, for example).

(8) In the embodiment, the memory interface 100 reads data by itself without being requested to do so by the bus master, and discards the read data in the following cases. One is the case in which the memory interface 100 does not receive a new read request in a predetermined time. The other is the case in which a difference between the read address specified by a newly received read request and the read address specified by the previous read request is greater than the address value indicated by the address-successiveness determination information 151.

However, the memory interface 100 may use the read data instead of discarding it. For example, by a burst stop signal output from the transfer control signal output circuit 106, the data buffer control unit 103 may be triggered to output data which is held therein at that point to the bus master which issued the previous read request, provided that the data is not requested to be read.

Further, upon receiving the data output by the memory interface 100, the bus master may store the data in a cache-line that is normally not in use, and the bus master may read the data from the cache without outputting a read request to the memory interface 100 when there is a need to use the data.

(9) In the embodiment, it is determined whether a difference between the read address specified by a new read request and the read address specified by the previous read request is within the address value defined by the address-successiveness determination information 151. However, as a result of successive reads, sometimes a difference between the read address in a new read request and the read address of the data currently being read becomes small, as shown in FIG. 7. This is because of that the memory interface 100 continued to read data from the memory 20 even while receiving data requests from the bus master, for example, at time T505 and time T508 in FIG. 7.

To address this, the following structure may be added to the embodiment. The memory interface 100 may start a successive read upon receiving a new read request, and determine whether a difference between the address specified by the received read request and the largest address among those corresponding to data stored in the data buffer control unit 103 is within a predetermined address value, prior to the step S403 of FIG. 4. If it is determined positively, the memory interface 100 does not terminate but continues the data read. The read data may be transferred from the data buffer control unit 103. Meanwhile, the predetermined address value corresponds to the number of addresses of data readable within time corresponding to the charge time.

With the above structure, the address-successiveness determination information 151 may be set to an address value simply corresponding to a transfer size in a burst transfer (four addresses in the examples of FIG. 5 to FIG. 7). For comparison, in the above embodiment, the address value is set to be greater than four so that the data transfer shown in FIG. 7 may be realized.

(10) Although in the embodiment the data buffer control unit 103 discards the data stored therein if the memory interface 100 issues a burst stop signal to the memory 20, the data may be retained without being discarded.

In this case, upon acquiring data in response to a new read request from the external data bus 142, the data buffer control unit 103 may overwrite the data so far stored therein in order from the oldest. Further, if the data buffer control unit 103 already holds the same data in response to the new read request, the data buffer control unit 103 may output the held data to the internal bus 130 without a need to newly read data from the memory 20.

(11) Each of functional parts of the memory interface 100 in the embodiment may also be implemented in the form of one or more LSIs, and a plurality of the functional parts may be implemented in the form of one LSI.

Furthermore, the integration of circuits is not limited to being realized with an LSI, but may be realized with a special-purpose circuit or a general-use processor. Alternatively, the integration may be realized with use of an FPGA (field programmable gate array) that is programmable after manufacturing of the LSI, or a re-configurable processor that enables re-configuration of the connection and settings of circuit cells in the LSI. Furthermore, if technology for an integrated circuit that replaces LSIs appears due to advances in or derivations from semiconductor technology, that technology may be used for integration of the functional blocks. Bio-technology is one possible application.

(12) Operations in the embodiment with respect to a burst transfer, processing of continuing and terminating a burst transfer, a processor for a computer system, and a control program comprising program codes executed by various circuits connected to the processor may be stored in storage medium, or circulated and distributed through various communication channels. Such storage medium includes an IC card, a hard disk, an optical disk, a flexible disk, a ROM. The circulated and distributed control program becomes available by being contained in a memory and the like which can be read by a processor. The various functions described in the embodiment will be realized by the processor executing the control program.

INDUSTRIAL APPLICABILITY

The present invention relates to a memory control device that is capable of increasing the speed of reading data from a memory by reducing the charge time. The present invention is useful in various digital home appliances, such as mobile phones, digital televisions, BD recorders, and DVD recorders.

REFERENCE SIGNS LIST

10: computer system (data processor)
20: memory
100: memory interface (memory control device)
101: a transfer request analysis circuit
102: state counter
103: data buffer control unit
104: burst stop control unit
105: burst stop setting sub-unit
106: transfer control signal output circuit
111: CPU (bus master)
112: DMAC (bus master)
130: internal bus
140: external address bus
141: external transfer control signal bus
142: external data bus
160: non-volatile device
170: external switch

The invention claimed is:

1. A memory control device that, in response to a read request issued from a bus master, reads data from a memory having a burst transfer function, the memory control device comprising:
a read unit operable to issue a read command to the memory according to a first read request issued from the bus master to burst read a predetermined amount of data in the memory starting from an address specified by the first read request;
a storage unit operable to, after the read unit completes reading data pertaining to the first read request, continuously read and store data starting from an address following a last address of the data read by the read unit;
a transfer unit operable to transfer the data read by the read unit to the bus master; and
a determination unit operable to determine, upon newly receiving a second read request from the bus master, whether a difference between an address specified by the second read request and the address specified by the first read request falls within a predetermined range,
wherein, if the determination unit determines that the difference between the address specified by the second read request and the address specified by the first read request falls within the predetermined range, then the transfer unit transfers, from the storage unit to the bus master, the predetermined amount of data starting from the address specified by the second read request.

2. The memory control device of claim 1, wherein, if the storage unit has not yet completed reading the data starting from the address specified by the second read request, then the transfer unit transfers the data to the bus master after waiting until the data read is completed.

3. The memory control device of claim 1, further comprising a termination unit operable to terminate the data read of the storage unit, if the determination unit determines that the difference between the address specified by the second read request and the address specified by the first read request does not fall within the predetermined range.

4. The memory control device of claim 1, further comprising a termination unit operable to terminate the data read of the storage unit, if a predetermined time has elapsed since reception of the first read request without receiving a new read request from the bus master.

5. The memory control device of claim 1, further comprising a termination unit operable to terminate the data read of the storage unit, if a predetermined time has elapsed after a transfer of the data specified by the first read request is completed by the transfer unit without receiving a new read request from the bus master.

6. A data processor including a bus master and a memory interface that reads, in response to a read request from a bus master, data from a memory including a burst transfer function,
wherein the memory interface includes:
a read unit operable to issue a read command to the memory according to a first read request issued from the bus master to burst read a predetermined amount of data in the memory starting from an address specified by the first read request;
a storage unit operable to, after the read unit completes reading data pertaining to the first read request, continuously read and store data starting from an address following a last address of the data read by the read unit;
a transfer unit operable to transfer the data read by the read unit to the bus master; and
a determination unit operable to determine, upon newly receiving a second read request from the bus master, whether a difference between an address specified by the second read request and the address specified by the first read request falls within a predetermined range,
wherein, if the determination unit determines that the difference between the address specified by the second read request and the address specified by the first read request falls within the predetermined range, then the transfer unit transfers, from the storage unit to the bus master, the predetermined amount of data starting from the address specified by the second read request.

7. A method for, in response to a read request issued from a bus master, reading data from a memory having a burst transfer function, the method comprising:
a reading step of issuing a read command to the memory according to a first read request issued from the bus master to burst read a predetermined amount of data in the memory starting from an address specified by the first read request;
a storing step of, after the reading step completes reading data pertaining to the first read request, continuously reading and storing data starting from an address following a last address of the data read in the reading step;
a transferring step of transferring the data read in the reading step to the bus master; and
a determining step of determining, upon newly receiving a second read request from the bus master, whether a difference between an address specified by the second read request and the address specified by the first read request falls within a predetermined range,
wherein, if the determination step determines that the difference between the address specified by the second read request and the address specified by the first read request falls within the predetermined range, then the predetermined amount of data starting from the address specified by the second read request is transferred from the storage unit to the bus master in the transferring step.

* * * * *